(12) United States Patent
Duthaler et al.

(10) Patent No.: US 7,388,572 B2
(45) Date of Patent: Jun. 17, 2008

(54) BACKPLANES FOR ELECTRO-OPTIC DISPLAYS

(75) Inventors: Gregg M. Duthaler, Needham, MA (US); Guy M. Danner, Somerville, MA (US); Jason C. Pinto, Cambridge (GB); Justin J. Abramson, Wayland, MA (US); David Miller, Wakefield, MA (US); John Atkinson, Somerville, MA (US); Alain Bouchard, Boston, MA (US)

(73) Assignee: E Ink Corporation, Cambridge, MA (US)

( * ) Notice: Subject to any disclaimer, the term of this patent is extended or adjusted under 35 U.S.C. 154(b) by 474 days.

(21) Appl. No.: 10/906,585

(22) Filed: Feb. 25, 2005

(65) Prior Publication Data

US 2005/0190137 A1    Sep. 1, 2005

Related U.S. Application Data

(60) Provisional application No. 60/548,633, filed on Feb. 27, 2004.

(51) Int. Cl.
*G09G 3/34* (2006.01)
*G02B 26/00* (2006.01)

(52) U.S. Cl. ......................... 345/107; 359/296
(58) Field of Classification Search .................. 345/60, 345/62, 65, 71, 87, 90, 97, 107
See application file for complete search history.

(56) References Cited

U.S. PATENT DOCUMENTS

| 2,800,457 A | 7/1957 | Green et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,001,140 A | 1/1977 | Foris et al. |
| 4,273,672 A | 6/1981 | Vassiliades |

(Continued)

FOREIGN PATENT DOCUMENTS

EP    0 659 866 A2    6/1995

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Duc Q Dinh
(74) *Attorney, Agent, or Firm*—David J. Cole

(57) ABSTRACT

A backplane for an electro-optic display comprises a plurality of pixel electrodes, and an adhesive layer disposed adjacent the backplane, the adhesive layer comprising a plurality of pixel regions disposed adjacent the pixel electrodes of the backplane, and at least one inter-pixel region disposed between two pixels of the backplane, the at least one inter-pixel region having at least one of a lower dielectric constant and a higher volume resistivity than the pixel regions of the adhesive layer.

19 Claims, 3 Drawing Sheets

U.S. PATENT DOCUMENTS

| | | |
|---|---|---|
| 4,418,346 A | 11/1983 | Batchelder |
| 4,640,583 A | 2/1987 | Hoshikawa et al. |
| 4,650,288 A | 3/1987 | White |
| 4,690,749 A | 9/1987 | Van Alstine et al. |
| 4,742,345 A | 5/1988 | DiSanto et al. |
| 4,892,607 A | 1/1990 | DiSanto et al. |
| 5,128,226 A | 7/1992 | Hung |
| 5,213,983 A | 5/1993 | Gustafsson et al. |
| 5,250,938 A | 10/1993 | DiSanto et al. |
| 5,302,235 A | 4/1994 | DiSanto et al. |
| 5,380,362 A | 1/1995 | Schubert |
| 5,403,518 A | 4/1995 | Schubert |
| 5,411,656 A | 5/1995 | Schubert |
| 5,460,688 A | 10/1995 | DiSanto et al. |
| 5,573,711 A | 11/1996 | Hou et al. |
| 5,627,561 A | 5/1997 | Laspina et al. |
| 5,635,317 A | 6/1997 | Taniguchi et al. |
| 5,686,383 A | 11/1997 | Long et al. |
| 5,688,584 A | 11/1997 | Casson et al. |
| 5,699,097 A | 12/1997 | Takayama et al. |
| 5,707,738 A | 1/1998 | Hou |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,891,366 A | 4/1999 | Gruenwald et al. |
| 5,930,026 A | 7/1999 | Jacobson et al. |
| 5,961,804 A | 10/1999 | Jacobson et al. |
| 5,972,493 A | 10/1999 | Iwasaki et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,136,128 A | 10/2000 | Chung |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,344,155 B1 | 2/2002 | Kitahara et al. |
| 6,365,949 B1 | 4/2002 | Ruiter et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,428,650 B1 | 8/2002 | Chung |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,873,451 B2 * | 3/2005 | Ukigaya ..................... 359/296 |
| 6,897,996 B2 * | 5/2005 | Ikeda et al. ................. 359/296 |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |

| | | |
|---|---|---|
| 2001/0030639 A1 | 10/2001 | Goden |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0180687 A1 | 12/2002 | Webber |
| 2003/0011560 A1 | 1/2003 | Albert et al. |
| 2003/0102858 A1 | 6/2003 | Jacobson et al. |
| 2003/0151702 A1 | 8/2003 | Morrison et al. |
| 2003/0173890 A1 | 9/2003 | Yamazaki et al. |
| 2003/0222315 A1 | 12/2003 | Amundson et al. |
| 2004/0014265 A1 | 1/2004 | Kazlas et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0226820 A1 | 11/2004 | Webber et al. |
| 2004/0239614 A1 | 12/2004 | Amundson et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0105159 A1 | 5/2005 | Paolini, Jr. et al. |
| 2005/0105162 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0134554 A1 | 6/2005 | Albert et al. |
| 2005/0151709 A1 | 7/2005 | Jacobson et al. |
| 2005/0152022 A1 | 7/2005 | Honeyman et al. |
| 2005/0156340 A1 | 7/2005 | Valianatos et al. |
| 2005/0168799 A1 | 8/2005 | Whitesides et al. |
| 2005/0168801 A1 | 8/2005 | O'Neil et al. |
| 2005/0179642 A1 | 8/2005 | Wilcox et al. |
| 2005/0270261 A1 | 12/2005 | Danner et al. |

FOREIGN PATENT DOCUMENTS

| | | |
|---|---|---|
| EP | 1 099 207 B1 | 3/2002 |
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 542 067 | 6/2005 |
| EP | 1 577 702 | 9/2005 |
| EP | 1 577 703 | 9/2005 |
| EP | 1 598 694 | 11/2005 |
| JP | 02-223936 A | 9/1990 |
| JP | 02-284124 A | 11/1990 |
| JP | 02-284125 A | 11/1990 |
| JP | 05-143009 A | 6/1993 |
| JP | 05-307197 A | 11/1993 |
| JP | 06-118452 A | 4/1994 |
| JP | 2000-259102 | 9/2000 |
| JP | 2002-072258 | 3/2002 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/001498 | 12/2003 |
| WO | WO 2004/079442 | 9/2004 |
| WO | WO 2004/090626 | 10/2004 |

OTHER PUBLICATIONS

Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gutcho, M.H., Microcapsules and Microencapsulation Techniques, Noyes Data Corp., Park Ridge NJ, (1976).
Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Hou, J., et al., "Active Matrix Electrophoretic Displays Containing Black and White Particles with Opposite Polarities", SID 01 Digest, 164 (Jun. 2001).
Jacobson, J., et al., "The last book", IBM Systems J., 36, 457 (1997).
Ji, Y., et al., "P-50: Polymer Walls in Higher-Polymer-Content Bistable Reflective Cholesteric Displays", SID 96 Digest, 611 (1996).
Jo, G-R, et al., "Toner Display Based on Particle Movements", Chem. Mater, 14, 664 (2002).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Ota, I., et al., "Developments in Electrophoretic Displays", Proceedings of the SID, 18, 243 (1977).
Pitt, M.G., et al., "Power Consumption of Microencapsulated Electrophoretic Displays for Smart Handheld Applications", SID 02 Digest, 1378 (2002).
Vandegaer, J.E. (ed.), "Microencapsulation Processes and Applications", pp. v-x, 1-180 (Plenum Press, New York 1974).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

BACKPLANES FOR ELECTRO-OPTIC DISPLAYS

REFERENCE TO RELATED APPLICATIONS

This application claims benefit of provisional Application Ser. No. 60/548,633, filed Feb. 27, 2004.

This application is related to copending application Ser. No. 10/708,121, filed Feb. 10, 2004 (Publication No. 2004/0252360), which is itself a continuation-in-part of copending application Ser. No. 10/064,389 filed Jul. 9, 2002 (now U.S. Pat. No. 6,831,769), which claims benefit of application Ser. No. 60/304,117, filed Jul. 9, 2001. The aforementioned copending application Ser. No. 10/708,121 also claims benefit of application Ser. No. 60/319,934, filed Feb. 11, 2003 and application Ser. No. 60/319,973, filed Feb. 26, 2003. This application is also related to the following applications and patents: (a) application Ser. No. 10/329,023, filed Dec. 24, 2002 (Publication No. 2003/0112491); (b) U.S. Pat. No. 6,727,881, issued on application Ser. No. 09/140,846, of which the aforementioned application Ser. No. 10/329,023 is a continuation; (c) application Ser. No. 08/504,896, filed Jul. 20, 1995 (now U.S. Pat. No. 6,124,851), of which the aforementioned U.S. Pat. No. 6,727,881 is a continuation-in-part; (d) application Ser. No. 08/983,404, filed Mar. 26, 1999, of which the aforementioned U.S. Pat. No. 6,727,881 is a continuation-in-part; (e) International Application No. PCT/US96/12000, of which the aforementioned application Ser. No. 08/983,404 is the United States national phase; (f) application Ser. No. 08/935,800, filed Sep. 23, 1997 (now U.S. Pat. No. 6,120,588), of which the aforementioned U.S. Pat. No. 6,727,881 is a continuation-in-part; (g) Provisional Applications Ser. Nos. 60/057,118; 60/057,122; 60/057,133; 60/057,163; 60/057,716; 60/057,798; 60/057,799; 60/059,358; 60/059,543; 60/065,529; 60/065,605; 60/065,630; 60/066,115; 60/066,147; 60/066,245; 60/066,246; 60/066,334; 60/066,418; 60/070,935; 60/070,939; 60/070,940; 60/071,371; 60/072,390; 60/074,454; 60/076,955; 60/076,956; 60/076,957; 60/076,959; 60/076,978; 60/078,363; 60/081,362; 60/081,374; 60/083,252; 60/085,096; 60/090,222; 60/090,223; 60/090,232; 60/092,046; 60/092,050; 60/092,742; and 60/093,689; from all of which the aforementioned application Ser. No. 09/140,846 claims priority; (h) application Ser. No. 10/064,279, filed Jun. 28, 2002 (now U.S. Pat. No. 6,657,772); (i) application Ser. No. 60/304,015, filed Jul. 9, 2001, from which the aforementioned application Ser. No. 10/064,279 claims priority; (j) application Ser. No. 10/249,957, filed May 23, 2003 (Publication No. 2004/0027327); (k) application Ser. No. 10/605,024, filed Sep. 2, 2003 (Publication No. 2004/0155857); (l) U.S. Pat. No. 6,312,304; (m) application Ser. No. 09/289,507, filed Apr. 9, 1999; (n) provisional application Ser. No. 60/081,362, filed Apr. 10, 1998, from which the aforementioned application Ser. No. 09/289,507 claims benefit; (o) application Ser. No. 09/436,303 (now abandoned), which is a divisional of the aforementioned application Ser. No. 09/289,507; (p) application Ser. No. 10/145,861, filed May 13, 2002 (Publication No. 2002/0180688), which is a continuation of the application Ser. No. 09/436,303; and (q) application Ser. No. 10/827,745, filed Apr. 20, 2004 (Publication No. 2004/0263947), which is a continuation of the aforementioned application Ser. No. 09/289,507. The entire contents of all the aforementioned applications, and of all United States Patents, published applications and copending applications mentioned below are herein incorporated by reference.

BACKGROUND OF THE INVENTION

This invention relates to electro-optic displays and backplanes for use in such displays. More specifically, in one aspect this invention relates to such backplanes provided with areas of low dielectric constant and/or high resistivity between adjacent pixels. This invention also relates to electro-optic displays incorporating such backplanes. In another aspect, this invention relates to electro-optic displays, and components thereof, which are designed to eliminate non-imaging areas between adjacent pixels caused by low resolution processes used to produce backplanes.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The electro-optic displays of the present invention typically contain an electro-optic material which is a solid in the sense that the electro-optic material has solid external surfaces, although the material may, and often does, have internal liquid or gas-filled spaces, and to methods for assembling displays using such an electro-optic material. Such displays using solid electro-optic materials may hereinafter for convenience be referred to as "solid electro-optic displays". Thus, the term "solid electro-optic displays" includes rotating bichromal member displays (see below), gas-based electrophoretic displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,07 16,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,279; 6,842,657; and 6,842,167; and U.S. Patent Applications Publication Nos. 2002/0060321; 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0102858; 2003/0132908; 2003/0137521; 2003/0151702; 2003/0214695; 2003/0214697; 2003/0222315; 2004/0012839; 2004/0014265; 2004/0027327; 2004/0075634; 2004/0094422; 2004/0105036; 2004/0112750; 2004/0119681; and 2004/0196215; 2004/0226820; 2004/0233509; 2004/0239614; 2004/0252360; 2004/0257635; 2004/0263947; 2005/0000813; 2005/0001812; 2005/0007336; 2005/0007653; 2005/0012980; 2005/0017944; 2005/0018273; and 2005/0024353; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; WO 2004/090857; and WO 2004/099862.

Another type of electro-optic display is an electro-wetting display developed by Philips and described in Haves, R. A., et al., "Video-Speed Electronic Paper Based on Electrowetting", Nature, Vol. 425, pages 383-385 (25 Sep. 2003). It is shown in copending application Ser. No. 10/711,802, filed Oct. 6, 2004 (Publication No. 2005/0151709), that such electro-wetting displays can be made bistable.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Another type of electro-optic display is an electro-wetting display developed by Philips and described in an article in the Sep. 25, 2003 issue of the Journal "Nature" and entitled "Performing Pixels: Moving Images on Electronic Paper". It is shown in copending application Ser. No. 10/711,802, filed Oct. 6, 2004, that such electro-wetting displays can be made bistable.

Other types of electro-optic materials, for example, polymer-dispersed liquid crystal, may also be used in the displays of the present invention.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, especially in the case of a display using an encapsulated electrophoretic medium. The lamination adhesive must have sufficient adhesive strength to bind the electro-optic layer to the layer (typically an electrode layer) to which it is to be laminated, and in the case of an encapsulated electrophoretic medium, the adhesive must also have sufficient adhesive strength to mechanically hold the capsules together. If the electro-optic display is to be of a flexible type (and one of the important advantages of rotating bichromal member and encapsulated electrophoretic displays is that they can be made flexible), the adhesive must have sufficient flexibility not to introduce defects into the display when the display is flexed. The lamination adhesive must have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 110° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive must be chemically compatible with all the other materials in the display. Solvent-based lamination adhesives should be avoided; it has been found (although this does not appear to have been described in the literature), that any solvent left behind in the adhesive after lamination has a strong tendency to introduce undesirable contaminants into the electro-optic medium.

As discussed in detail in the aforementioned U.S. Pat. No. 6,831,769, a lamination adhesive used in an electro-optic display must meet certain electrical criteria, and this introduces considerable problems in the selection of the lamination adhesive. Commercial manufacturers of lamination adhesives naturally devote considerable effort to ensuring that properties, such as strength of adhesion and lamination temperatures, of such adhesives are adjusted so that the adhesives perform well in their major applications, which typically involve laminating polymeric and similar films. However, in such applications, the electrical properties of the lamination adhesive are not relevant, and consequently the commercial manufacturers pay no heed to such electrical properties. Indeed, E Ink researchers have observed substantial variations (of up to several fold) in certain electrical properties between different batches of the same commercial lamination adhesive, presumably because the manufacturer was attempting to optimize non-electrical properties of the lamination adhesive (for example, resistance to bacterial growth) and was not at all concerned about resulting changes in electrical properties.

However, in electro-optic displays, in which the lamination adhesive is normally located between the electrodes which apply the electric field needed to change the electrical state of the electro-optic medium, the electrical properties of the adhesive become crucial. As will be apparent to electrical engineers, the volume resistivity of the lamination adhesive becomes important, since the voltage drop across the electro-optic medium is essentially equal to the voltage drop across the electrodes, minus the voltage drop across the lamination adhesive. If the resistivity of the adhesive layer is too high, a substantial voltage drop will occur within the adhesive layer, requiring an increase in voltage across the electrodes. Increasing the voltage across the electrodes in this manner is undesirable, since it increases the power consumption of the display, and may require the use of more complex and expensive control circuitry to handle the increased voltage involved. On the other hand, if the adhesive layer, which extends continuously across the display, is in contact with a matrix of electrodes, as in an active matrix display, the volume resistivity of the adhesive layer should not be too low, or lateral conduction of electric current through the continuous adhesive layer may cause undesirable cross-talk between adjacent electrodes.

In practice, a lamination adhesive layer having a uniform thickness of 10-50 μm and a conductivity of the order of $10^{-10}$ to $10^{-9}$ S/cm has been used in electro-optic displays. This conductivity range was chosen based upon electrical models for display performance, the known conductivities of various electro-optic materials and the pixel sizes typically used in such displays. This target conductivity range actually represents a compromise. More conductive lamination adhesives are desirable because higher conductivity means the electro-optic material layer sees a larger voltage gradient. However, as the conductivity of the lamination adhesive is increased at constant pixel resolution and storage capacitance, charge supplied to a pixel is leaked to neighboring pixels; this decreases the voltage gradient across the ink and counteracts the effect of increasing the lamination adhesive conductivity. In addition, as already mentioned this lateral charge leakage may cause a change in the optical state of neighboring pixels. It is desirable that the lamination adhesive be designed to provide good lateral voltage holding capability and that the gradient in voltage across the ink layer be maximized; therefore, development performance requirements for high resolution (100 to 200 lines per inch, 4 to 8 lines per mm) active-matrix displays require that isotropically conductive adhesives have conductivities in the range specified above.

There is another problem associated with the use of adhesives in electro-optic displays, namely pixel "blooming", that is to say the tendency for a pixel electrode to cause a change in the display state of the electro-optic medium over an area larger than that occupied by the pixel electrode itself. This blooming effect is illustrated schematically in FIG. 1A of the accompanying drawings, which shows the equipotential lines caused by application of driving voltage to two adjacent pixel electrodes of an electro-optic display. As will be seen from FIG. 1A, the equipotential lines spread outwardly as distance from the pixel electrode increases, and since the area within which a driving voltage applied to a pixel electrode causes a change in the display state of the electro-optic medium follows the equipotential lines, if (say) pixel 1, the left-hand pixel is FIG. 1A has applied thereto a driving voltage which turns the electro-optic medium to its black display state (as seen by an observer viewing the medium from above in FIG. 1A), the resultant black area, designated D1, is substantially larger than pixel 1 itself. Similarly, if pixel 2, the right-hand pixel is FIG. 1A has applied thereto a driving voltage which turns the electro-optic medium to its black display state, the resultant black area, designated D2, is substantially larger than pixel 2 itself. A central area between pixels 1 and 2 will turn black whenever the driving voltage is applied to either pixel 1 or pixel 2. Such pixel blooming is undesirable, since it adversely affects the quality of the displayed image.

Pixel blooming can be reduced by reducing the thickness of the adhesive layer, but an adhesive layer which is too thin may give rise to other problems. For example, an adhesive layer which is deposited over a layer of capsules forming an encapsulated electrophoretic medium may serve not only to laminate the capsules to a backplane, but also to planarize the uneven surface of the layer of capsules. An adhesive layer which is too thin may fail to provide sufficient adhesion and may also fail to planarize the capsule layer. Hence, it is not desirable to reduce the thickness of the adhesive layer too far, and the thickness chosen may be a compromise between that needed to reduce pixel blooming and that required for planarization and good adhesion.

The aforementioned 2004/0252360 describes an electro-optic display using an anisotropic lamination adhesive having a higher electrical conductivity in a direction perpendicular to the layer of lamination adhesive than in the plane of this layer. One aspect of the present invention relates to an alternative modification of an adhesive layer which provides advantages similar to those provided by the use of an anisotropic lamination adhesive without requiring the formation of such an adhesive. This aspect of the present invention also reduces pixel blooming.

Although blooming has been described above as a problem in electro-optic displays, there are certain circumstances in which a controlled amount of blooming may actually be useful, and a second aspect of the present invention relates to providing electro-optic displays with such controlled blooming.

Certain types of electro-optic displays, especially so-called "direct drive displays" (in which a plurality of pixels are present, each pixel having a pixel electrode and a separate conductor associated therewith, the display having a controller arranged to control the voltage applied to each pixel electrode via its associated conductor), are often produced using low resolution processes which leave significant gaps between adjacent pixels; such displays may, for example, have the form of seven-segment displays used to display numerals. In such displays, it is advantageous for the electro-optic medium to display a controlled amount of blooming, such that the area of electro-optic medium the optical state of which is changed by the pixel electrodes covers the gap between adjacent pixel electrodes so that these gaps effectively disappear when an observer views the resultant display. However, the blooming should not be so great that the image intended to be displayed becomes distorted. The second main aspect of the present invention relates to methods for achieving such controlled blooming in electro-optic displays.

SUMMARY OF THE INVENTION

In one aspect, this invention provides a backplane for an electro-optic display, the backplane comprising a plurality of pixel electrodes, and an adhesive layer disposed adjacent the backplane, the adhesive layer comprising a plurality of pixel regions disposed adjacent the pixel electrodes of the backplane, and at least one inter-pixel region disposed between two pixels of the backplane, the at least one inter-pixel region having at least one of a lower dielectric constant and a higher volume resistivity than the pixel regions of the adhesive layer.

For convenience, this aspect of the present invention may hereinafter be called the "ribbed backplane" of the invention. In a preferred form of this backplane, the inter-pixel region(s) comprise at least one rib formed from a material different from the material forming the pixel regions. Such a rib may have a dielectric constant less than about 3, and/or volume resistivity greater than about $10^{12}$ ohm cm. The rib may have an aspect ratio (the height of the rib divided by its width) of at least about 0.5, desirably at least about 1.0 and preferably at least about 2.0. The rib or ribs may not extend completely through the adhesive layer so that the end of the or each rib remote from the backplane is covered by adhesive.

The present invention extends to an electro-optic display comprising a ribbed backplane of the invention and layer of an electro-optic medium adjacent the adhesive layer. Such a display may make use of any of the types of bistable electro-optic media discussed above. Thus, for example, the display may comprise an electrophoretic electro-optic medium comprising a plurality of electrically charged particles in a suspending fluid and capable of moving through the suspending fluid on application of an electric field to the suspending fluid. The suspending fluid may be gaseous or liquid. The electrophoretic medium may be encapsulated, i.e., the charged particles and the suspending fluid may be confined within a plurality of capsules or microcells. The first method may also be used with a display comprising a rotating bichromal member or electrochromic medium.

As already mentioned, the second main aspect of the present invention relates to producing controlled blooming in an electro-optic display to cover gaps between adjacent pixel electrodes. Within this overall objective, this second main aspect of the present invention encompasses several different approaches. This invention provides an electro-optic display comprising at least two pixel electrodes spaced from one another and a layer of an electro-optic medium disposed adjacent the pixel electrodes, the layer of electro-optic medium having a thickness of about 20 to about 25 μm and a volume resistivity of about $1\times10^{10}$ to about $4\times10^{10}$ ohm cm.

This invention also provides an electro-optic display comprising at least two pixel electrodes spaced from one another, an adhesive layer adjacent the pixel electrodes, and a layer of an electro-optic medium disposed on the opposed side of the adhesive layer from the pixel electrodes, the adhesive layer having a thickness of about 40 to about 60 μm and a volume resistivity of about $3\times10^{9}$ to about $8\times10^{9}$ ohm cm.

Finally, this invention provides a method of driving an electro-optic display comprising at least two pixel electrodes spaced from one another and a layer of an electro-optic medium disposed adjacent the pixel electrodes, which method comprises applying to both of the pixel electrodes a voltage pulse having a voltage and duration of from about 1.1 to about 3 times that required to achieve a saturated optical state of the electro-optic medium. Desirably, the voltage pulse has a voltage and duration of at least about 1.3, preferably at least about 1.5, times that required to achieve a saturated optical state.

BRIEF DESCRIPTION OF THE DRAWINGS

As already mentioned, FIG. 1A of the accompanying drawings illustrates the equipotential lines produced when a driving voltage is applied to two adjacent pixels of a prior art electro-optic display.

DETAILED DESCRIPTION OF THE INVENTION

Figure 1A:
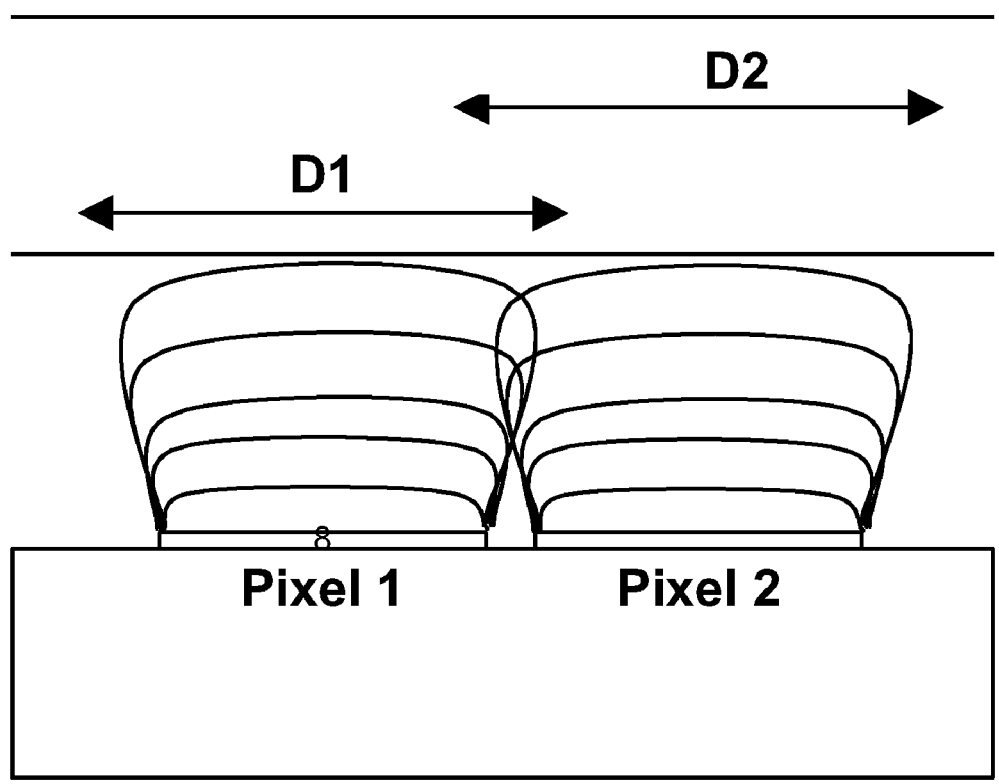
FIG. 1B is a view similar to that of FIG. 1A but showing the equipotential lines produced when a driving voltage is applied to two adjacent pixels of an electro-optic display of the present invention incorporating a ribbed backplane.

As already mentioned, in its first major aspect this invention provides a backplane for an electro-optic display, the backplane comprising a plurality of pixel electrodes, and an adhesive layer disposed adjacent the backplane, the adhesive layer comprising a plurality of pixel regions disposed adjacent the pixel electrodes of the backplane, and at least one inter-pixel region disposed between two pixels of the backplane, the at least one inter-pixel region having at least one of a lower dielectric constant and a higher volume resistivity than the pixel regions of the adhesive layer.

This invention also provides an electro-optic display incorporating such a backplane, i.e., an electro-optic display comprising a layer of a solid electro-optic material, a backplane comprising a plurality of pixel electrodes disposed adjacent the layer of electro-optic material, and an adhesive layer interposed between the electro-optic material and the backplane, the adhesive layer comprising a plurality of pixel regions disposed adjacent the pixel electrodes of the backplane, and at least one inter-pixel region disposed between two pixels of the backplane, the at least one inter-pixel region having at least one of a lower dielectric constant and a higher volume resistivity than the pixel regions of the adhesive layer.

In theory, the lower dielectric constant and/or higher volume resistivity of the inter-pixel region of the adhesive layer could be produced by treatment of an originally essentially homogeneous adhesive layer. For example, the adhesive layer could be radiation cured in an imagewise manner to produce inter-pixel regions having higher volume resistivity than the pixel regions of the adhesive layer. However, at present it is preferred that the inter-pixel regions be formed by bodies (ribs) which are separate from the remainder of the adhesive layer. The ribs preferably have a very low dielectric constant (typically less than k=3) and are very good insulators (volume resistivity desirably greater than $10^{12}$ ohm. cm). The aspect ratio (height/width) of the ribs is desirably greater than about 0.5, preferably greater than about 1.0, and most desirably greater than about 2.0. Typically, the ribs will have a width of the order of 1-20 µm. Examples of commercially available low-k dielectric material include Nanoglass (Registered Trade Mark) E with k=2.2 (Honeywell Corporation, Sunnyvale Calif.), Black Diamond with k=3 (Applied Materials, Santa Clara, Calif.), nanoporous silica aerogels with 1.1<k<2.5 (Nanopore Inc., Albuquerque, N. Mex.), or other such materials known to those skilled in the art. The ribs may have a variety of cross sections, including square, rectangular, trapezoidal, half-round, etc., depending on the process used to form them and the specific display in which they are used. The ribs may be manufactured using photolithographic methods, printing techniques, or other processes known to those skilled in the art. Depending upon the size of the pixels involved, it may also be possible to fabricate a set of ribs for a backplane as a separate object (for example, by punching, die cutting or molding a web of material and then cutting the web to produce sets of ribs for individual displays) and then laminating or adhering the set of ribs to the backplane.

Figure 1B:
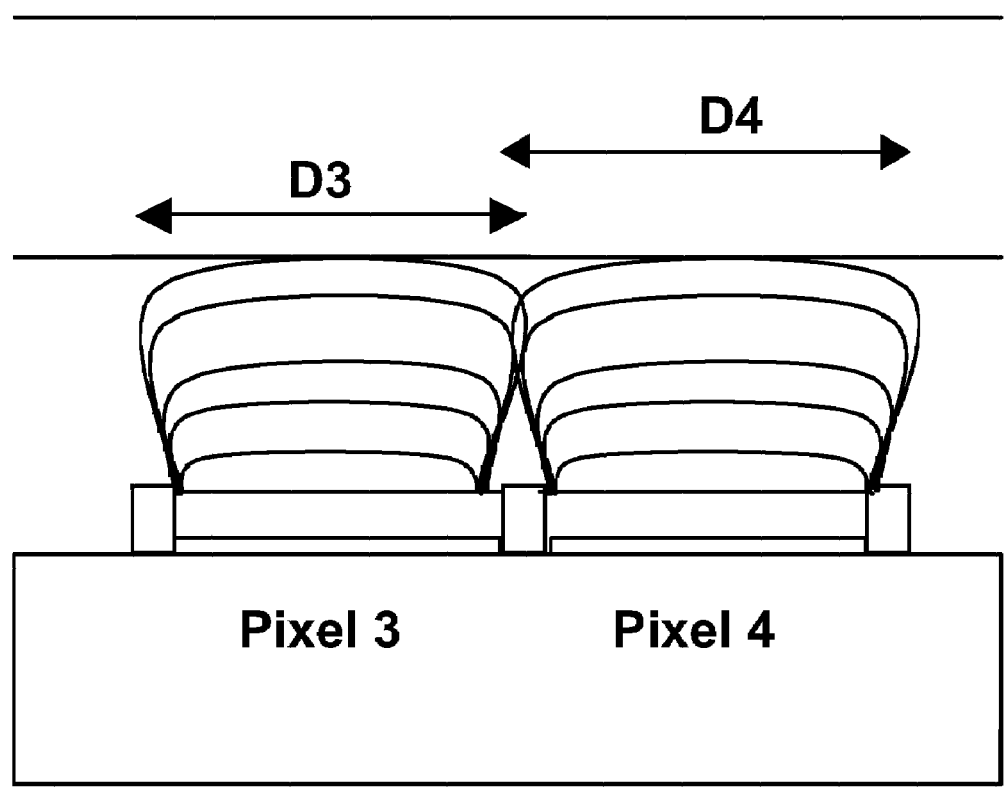

As shown in FIG. 1B, the ribs (or other inter-pixel regions) function by reducing the tendency for the equipotential lines to spread out into a blooming pattern. More specifically, the ribs prevent the blooming of the equipotential lines within that portion of the thickness of the adhesive layer lying between the backplane and the upper edges (as illustrated in FIG. 1B) of the ribs, so that overall the blooming of the pixels is reduced and the areas D3 and D4 produced by pixels 3 and 4 are smaller that the corresponding areas D1 and D2 shown in FIG. 1A. Also, of course, the overlap between areas D3 and D4 is substantially smaller than that between D1 and D2.

Figure 2:
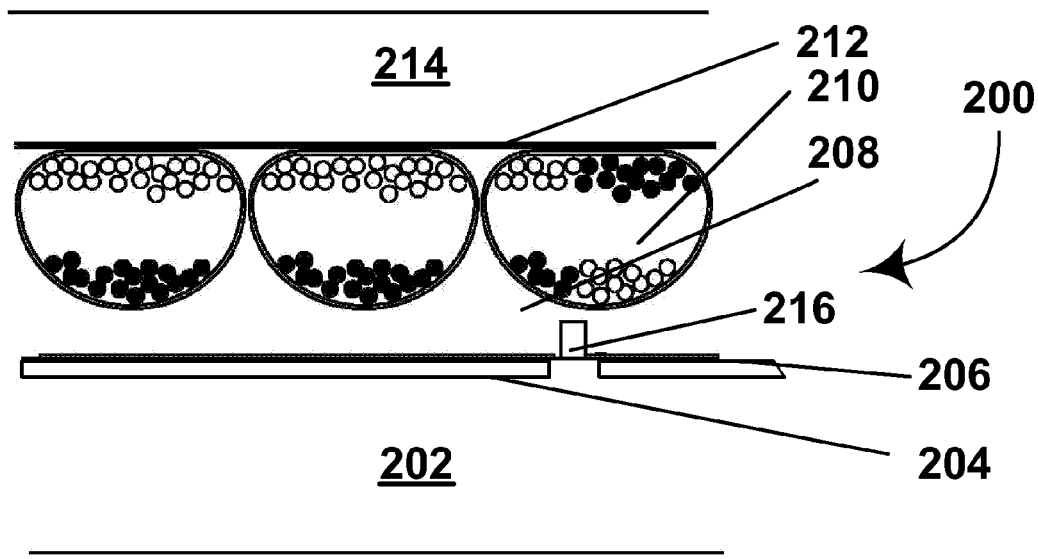
FIG. 2 is a schematic side elevation of a small section of an encapsulated electrophoretic display of the present invention incorporating a ribbed backplane.

FIG. 2 is a schematic side elevation of a small section of an encapsulated electrophoretic display of the present invention incorporating a ribbed backplane. This display (generally designated 200) comprises a backplane 202 having pixel electrodes 204 and 206, an adhesive layer 208, an encapsulated electrophoretic layer 210, a common front electrode 212 and a transparent front substrate 214, which forms a viewing surface through which an observer views the display 200.

In accordance with the present invention, the display 200 further comprises ribs 216, only one of which is shown in FIG. 2. The ribs 216 are of rectangular cross-section and do not extend completely though the thickness of the adhesive layer 208, so that they do not contact the capsules of the electrophoretic layer 210 being separated therefrom by part of the thickness of the adhesive layer 208. For example, if the adhesive layer is approximately 15 µm thick, the ribs 216 may be approximately 6 µm tall, thus reducing field spreading and blooming to that observed with a 9 µm adhesive layer.

The use of ribs in accordance with the present invention allows the use of a thicker or more conductive adhesive layer that would otherwise be possible without sacrificing resolution through blooming effects. The more conductive adhesive reduces the voltage drop within the adhesive layer, thus increasing the voltage drop across the electro-optic medium itself, and thus increasing the switching speed of the medium.

The ribbed backplanes of the present invention may be especially useful in high resolution displays in which the individual pixels are small, since blooming is largely a function of the thickness of the layers lying between the electrodes, and since it is not normally possible to reduce the thickness of these layers as the size of the pixels is reduced, blooming becomes a greater problem with smaller pixels, in the sense that the area affected by blooming becomes larger relative to the size of the individual pixels. Blooming is a particular problem in high resolution color displays, where pixels of differing colors lie closely adjacent each other. Consider for example a red/green/blue color display in which the pixels are arranged in rows of the same color, so that, for example, a red pixel is flanked by blue and green pixels in adjacent rows. If it is desired to display pure red, the red pixels are set to display red while the green and blue pixels are set to display black. If blooming occurs at the red pixel, part of the adjacent green and blue pixels will display green and blue respectively, thus rendering the desired red color less saturated. The smaller the pixels of such a display, the greater is the effect of a given amount of blooming.

For these reasons, the ribbed backplanes of the present invention may be especially useful in color displays. Such color displays may be of any of the types of electro-optic displays known in the art, and in particular may be of any of the types described in the aforementioned 2004/0263947, the entire disclosure of which is herein incorporated by reference and to which the reader is specifically referred for further information. The displays described in this published application include:

(a) A display comprising: a full-color pixel comprising a first addressable sub-pixel and a second sub-pixel independently addressable from the first sub-pixel, wherein each of the first sub-pixel and the second sub-pixel comprises electrophoretic particles and is capable of displaying three or more colors selected from the group consisting of white, black, red, green, blue, cyan, magenta and yellow when addressed (see especially FIG. 1D and Paragraph [0087] of this published application);

(b) Displays in which particles are moved laterally so as to cover or reveal a colored reflector or filter disposed on the opposed side of the particles from an observer (see especially FIGS. 2A-2D and 3A-3E, and Paragraphs [0088] to [0097]);

(c) Displays generally similar to those mentioned in (b) above but having two different types of particles having differing colors, so that each pixel of the display can display (i) the color of the first type of particles; (ii) the color of the second type of particles; or (iii) the color of a reflector or filter disposed on the opposed side of the particles from an observer (see FIGS. 3F-3I, and Paragraphs [0098]-[0101]);

(d) Displays generally similar to those mentioned in (c) above but in which a suspending fluid in which the particles are suspended is colored and the reflector or filter is omitted, so that the third colored state occurs when the color of the suspending fluid is visible to the observer (see FIG. 3L and Paragraph [0103]); and (e) Displays having three different types of particles having differing colors (see FIGS. 3M, 5, 6A-6B, 7A-7D and 8A-8C and Paragraphs [0103] to [0113]).

Numerous other types of color displays can also of course be improved by use of ribbed backplanes of the present invention.

Ribbed backplanes are also useful in preventing "creep" in flexible displays, for example displays in which the backplane (and any front substrate present) is formed from a flexible polymeric film, flexible metal foil or similar flexible material. When such displays are flexed, the adhesive layer used to secure the backplane to the electro-optic medium and other layers of the display tends to undergo fluid flow, with the result that the electro-optic medium moves slightly relative to the backplane. This can cause serious problems if, for example, the display is a color display in which a color filter array is disposed on the opposed side of the electro-optic medium from the backplane, since in such a display the various color stripes or other units of the color filter array need to aligned with the pixel electrodes or serious color distortion may occur in the displayed image. Consider for example a display in which two adjacent pixel electrodes are aligned with red and blue color filter elements. If the color filter array creeps relative to the backplane such that the pixel electrode originally aligned with the red element is now aligned with half the red element and half the blue element, it will readily be apparent that the colors of the displayed image will differ substantially from that intended.

By providing ribs within the adhesive layer in accordance with the present invention, creep can be minimized or eliminated. Ribs may be used to prevent creep only and not to reduce blooming, in which case the dielectric constant and volume resistivity of the ribs is irrelevant, and it is only necessary that the ribs be sufficiently rigid, and sufficiently adhered to the backplane, to resist fluid flow of the adhesive. More typically, however, ribs will be used to reduce both blooming and creep simultaneously.

The second major aspect of the present invention, namely producing controlled blooming in displays having gaps between adjacent electrodes, will now be discussed. As already mentioned, the present invention provides three different approaches to providing such controlled blooming, namely (a) controlling the thickness and volume resistivity of the electro-optic medium; (b) controlling the thickness and volume resistivity of the adhesive layer; and (c) controlling the length of the driving pulse, or more specifically using a driving pulse which is substantially longer than the duration of the pulse of the same voltage which is required to achieve a saturated optical state of the electro-optic medium. (The term "achieve a saturated optical state",refers to a pulse which, starting with the electro-optic medium in one of its extreme optical states, will cause the electro-optic medium to traverse 90 per cent of its full optical range towards the other extreme optical state.

It has been found that the preferred electrophoretic displays described in certain of the aforementioned E Ink and MIT patents and applications, especially the "related applications" mentioned in the first part of this application, are not well-adapted for controlled blooming. Typically the electrophoretic layer of such an electrophoretic display will have been optimized for a high resolution active matrix backplane for which no blooming is desirable, will have a thickness of about 20 µm and a volume resistivity of about $4\times10^{10}$ ohm cm, while its associated adhesive layer has a thickness of about 25 µm and a volume resistivity of about $8\times10^9$ ohm cm. A typical waveform for such a display is global updating (i.e., every pixel is rewritten) using 15 V, 800 millisecond pulses.

An appropriate degree of controlled blooming can also be achieved using an adhesive layer having a thickness of about 40 to about 60 µm and a volume resistivity of about $3\times10^9$ to about $8\times10^9$ ohm cm. The conductivity of the adhesive layer can be controlled by appropriate choice of materials, by including additives therein, or by controlling the degree of cross-linking of the adhesive, as described in the copending application Ser. No. 10/810,761 (now U.S. Pat. No. 7,012,735) and WO 2004/088395.

In backplanes produce by low resolution processes, a typical gap between adjacent pixels might be 200 µm (0.2 mm) and the blooming of the prior art electrophoretic displays described above is insufficient to "close" such gaps. It has been found that controlled blooming sufficient to close 200 µm gaps can be achieved by increasing the thickness and/or conductivity of the electro-optic medium and/or adhesive layers, or by using addressing pulses longer than those required to achieve optical saturation.

More specifically, it has been found that an appropriate degree of controlled blooming can be achieved using an electro-optic medium thickness of about 20 to about 25 µm and a volume resistivity of about $1\times10^{10}$ to about $4\times10^{10}$ ohm cm. The conductivity of the electro-optic medium can be controlled by appropriate choice of materials; when the electro-optic medium comprises a plurality of droplets of suspending fluid containing electrophoretic particles in a continuous binder phase, as described in the aforementioned E Ink and MIT patents and applications, it is typically easiest to control the conductivity of the electro-optic medium by choice of the binder phase. The conductivity of the electro-optic medium may also be controlled by including ionic additives therein.

An appropriate degree of controlled blooming can also be achieved using an adhesive layer having a thickness of about 40 to about 60 µm and a volume resistivity of about $3\times10^9$ to about $8\times10^9$ ohm cm. The conductivity of the adhesive layer can be controlled by appropriate choice of materials, by including additives therein, or by controlling the degree of cross-linking of the adhesive, as described in the aforementioned copending application Ser. No. 10/810,761 and WO 2004/088395.a Finally, it has been found that an appropriate degree of controlled blooming can also be achieved using drive pulses which are longer than required to achieve optical saturation of the electro-optic medium, more specifically drive pulses having lengths which exceed that required to achieve optical saturation by 10 to 200 per cent. The drive scheme used may involve either global or local updates, i.e., all the pixels may be rewritten at each update or only the pixels which require to be changed may be rewritten. Controlled blooming may also be achieved by repeated application of an addressing pulse and its inverse to the addressed pixels, since this has been found to give greater blooming than application of only a single driving pulse.

From the foregoing, it will be seen that the second aspect of the present invention provides methods effective to optically close gaps between pixels in electro-optic displays, which may be of any of the types previously discussed. These methods significantly improve the appearance of displays formed by low resolution methods, thus increasing the commercial attractiveness of such displays.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

What is claimed is:

1. A backplane for an electro-optic display, the backplane comprising a plurality of pixel electrodes, and an adhesive layer disposed adjacent the backplane, the adhesive layer comprising a plurality of pixel regions disposed adjacent the pixel electrodes of the backplane, and at least one inter-pixel region disposed between two pixels of the backplane, the at least one inter-pixel region having at least one of a lower dielectric constant and a higher volume resistivity than the pixel regions of the adhesive layer.

2. A backplane according to claim 1 wherein the at least one inter-pixel region comprises at least one rib formed from a material different from the material forming the pixel regions.

3. A backplane according to claim 2 wherein the at least one rib has a dielectric constant less than about 3.

4. A backplane according to claim 2 wherein the at least one rib has a volume resistivity greater than about $10^{12}$ ohm cm.

5. A backplane according to claim 2 wherein the at least one rib has an aspect ratio of at least about 0.5.

6. A backplane according to claim 5 wherein the at least one rib has an aspect ratio of at least about 1.0.

7. A backplane according to claim 6 wherein the at least one rib has an aspect ratio of at least about 2.0.

8. A backplane according to claim 2 wherein the at least one rib does not extend completely through the adhesive layer so that the end of the at least one rib remote from the backplane is covered by adhesive.

9. An electro-optic display comprising a backplane according to claim 1 and a layer of a solid electro-optic medium adjacent the adhesive layer.

10. An electro-optic display according to claim 9 wherein the at least one inter-pixel region comprises at least one rib formed from a material different from the material forming the pixel regions.

11. An electro-optic display according to claim 10 wherein the at least one rib has a dielectric constant less than about 3.

12. An electro-optic display according to claim 10 wherein the at least one rib has a volume resistivity greater than about $10^{12}$ ohm cm.

13. An electro-optic display according to claim 10 wherein the at least one rib does not extend completely through the adhesive layer so that the end of the at least one rib is separated from the layer of electro-optic medium by adhesive.

14. An electro-optic display according to claim 9 wherein the electro-optic medium comprises an electrophoretic electro-optic medium comprising a plurality of electrically charged particles in a suspending fluid and capable of moving through the suspending fluid on application of an electric field to the suspending fluid.

15. An electro-optic display according to claim 14 wherein the suspending fluid is gaseous.

16. An electro-optic display according to claim 14 wherein the charged particles and the suspending fluid are confined within a plurality of capsules or microcells.

17. An electro-optic display according to claim 9 wherein the electro-optic medium comprises a rotating bichromal member or electrochromic medium.

18. An electro-optic display comprising at least two pixel electrodes spaced from one another and a layer of an electro-optic medium disposed adjacent the pixel electrodes, the layer of electro-optic medium having a thickness of about 20 to about 25 µm and a volume resistivity of about $1 \times 10^{10}$ to about $4 \times 10^{10}$ ohm cm.

19. An electro-optic display comprising at least two pixel electrodes spaced from one another, an adhesive layer adjacent the pixel electrodes, and a layer of an electro-optic medium disposed on the opposed side of the adhesive layer from the pixel electrodes, the adhesive layer having a thickness of about 40 to about 60 µm and a volume resistivity of about $3 \times 10^9$ to about $8 \times 10^9$ ohm cm.

\* \* \* \* \*